(12) United States Patent
Beck et al.

(10) Patent No.: US 8,880,035 B1
(45) Date of Patent: Nov. 4, 2014

(54) USER CUSTOMIZABLE REVERSE RING TONE

(75) Inventors: Alexander John Gray Beck, Frenchs Forest (AU); Colin Blair, Westleigh (AU); David Preshan Thambiratnam, Ashfield (AU); James K. Wan, Carlingford (AU)

(73) Assignee: Avaya Inc., Basking Ridge, NJ (US)

( * ) Notice: Subject to any disclaimer, the term of this patent is extended or adjusted under 35 U.S.C. 154(b) by 748 days.

(21) Appl. No.: 10/841,037

(22) Filed: May 6, 2004

Related U.S. Application Data

(60) Provisional application No. 60/558,433, filed on Mar. 31, 2004.

(51) Int. Cl.
*H04L 12/58* (2006.01)
*H04M 1/725* (2006.01)

(52) U.S. Cl.
USPC .................. 455/412.1; 455/412.2; 455/414.1; 455/414.4; 455/418; 455/567; 455/413; 379/88.22; 379/88.23; 379/88.24; 379/418

(58) Field of Classification Search
USPC ........ 455/563, 566, 418, 550.1, 412.1, 412.2, 455/413, 414.1, 414.4, 417, 567, 415, 455/422.1; 379/418, 67.1, 68, 69, 70, 75, 379/88.11, 88.12, 88.24, 14.01, 142.07, 379/88.22, 88.23
See application file for complete search history.

(56) References Cited

U.S. PATENT DOCUMENTS

| | | | |
|---|---|---|---|
| 4,166,929 A | 9/1979 | Sheinbein | |
| 4,277,649 A | 7/1981 | Sheinbein | |
| 5,426,594 A | 6/1995 | Wright et al. | |
| 5,594,784 A | 1/1997 | Velius | |
| 5,734,699 A | 3/1998 | Lu et al. | |
| 6,041,117 A | 3/2000 | Androski et al. | |
| 6,199,076 B1 | 3/2001 | Logan et al. | |
| 6,219,413 B1 * | 4/2001 | Burg | 379/215.01 |
| 6,373,925 B1 * | 4/2002 | Guercio et al. | 379/82 |
| 6,490,346 B2 * | 12/2002 | Lee et al. | 379/162 |
| 6,574,335 B1 * | 6/2003 | Kalmanek et al. | 379/386 |

(Continued)

FOREIGN PATENT DOCUMENTS

| | | | | |
|---|---|---|---|---|
| GB | 2343084 A | * | 4/2000 | |
| WO | WO 99/29091 | * | 6/1999 | H04M 3/50 |

OTHER PUBLICATIONS

U.S. Appl. No. 10/801,960, filed Mar. 15, 2004, Delaney et al.

*Primary Examiner* — Olumide T Ajibade Akonai
(74) *Attorney, Agent, or Firm* — Sheridan Ross P.C.

(57) ABSTRACT

An improved system and method to provide important information either, as voice, text, picture, holographic image or video from the called party to a calling party before the called party answers a telephone. The information may be a recorded voice, text, image or video message. The called party may send a voice message, for example, and send it along with a call alerting message. The voice message may be recorded beforehand. Instead of the calling party's telephone playing a ringback signal, the recorded voice message is played or a data/bearer stream is heard. The calling party hears the voice message instead of the ringback tone normally heard when there is an incoming telephone call. If the calling and called party have telephones, such as mobile phones, IP phones, IP softphones, PDA with telephony capabilities, etc., which allow for multimedia messages such as text, images and video messages, the called party's recorded voice message may include text, images or video.

46 Claims, 9 Drawing Sheets

(56) References Cited

U.S. PATENT DOCUMENTS

| | | |
|---|---|---|
| 6,603,844 B1 | 8/2003 | Chavez, Jr. et al. |
| 6,631,271 B1 | 10/2003 | Logan |
| 6,690,770 B2 * | 2/2004 | Brandt ............................ 379/52 |
| 6,741,678 B2 * | 5/2004 | Cannell et al. ............. 379/88.14 |
| 6,788,766 B2 | 9/2004 | Logan |
| 6,816,577 B2 | 11/2004 | Logan |
| 6,941,131 B2 * | 9/2005 | Roderique .................... 455/417 |
| 6,944,277 B1 * | 9/2005 | Viikki ...................... 379/142.06 |
| 6,954,455 B1 | 10/2005 | Al Hakim et al. |
| 6,975,709 B2 * | 12/2005 | Wullert, II ................ 379/88.23 |
| 6,983,145 B1 * | 1/2006 | Uskela ....................... 455/426.2 |
| 6,996,402 B2 | 2/2006 | Logan et al. |
| 6,999,575 B1 | 2/2006 | Sheinbein |
| 7,088,816 B2 | 8/2006 | Donnelly |
| 7,123,903 B2 * | 10/2006 | Seki ........................... 455/414.1 |
| 7,304,983 B2 | 12/2007 | Simpson et al. |
| 7,330,542 B2 * | 2/2008 | Kauhanen et al. ............ 379/229 |
| 8,644,886 B1 * | 2/2014 | Delaney et al. ............... 455/567 |
| 2003/0129968 A1 * | 7/2003 | Earl ............................... 455/412 |
| 2004/0203794 A1 * | 10/2004 | Brown et al. ................. 455/445 |
| 2004/0213401 A1 | 10/2004 | Aupperle et al. |
| 2005/0008129 A1 * | 1/2005 | Wullert, II ................. 379/88.22 |
| 2005/0143103 A1 | 6/2005 | Bjorgan et al. |
| 2005/0147227 A1 * | 7/2005 | Chervirala et al. ...... 379/215.01 |
| 2007/0026852 A1 | 2/2007 | Logan et al. |

\* cited by examiner

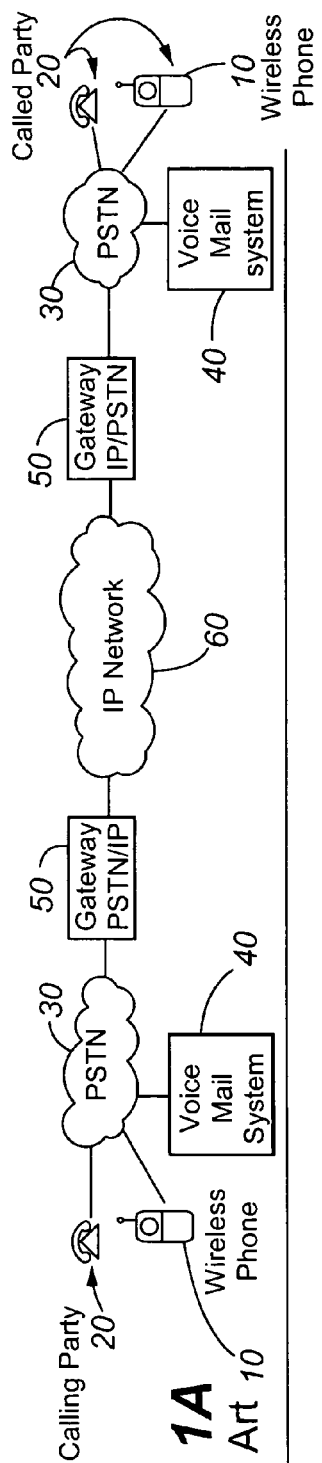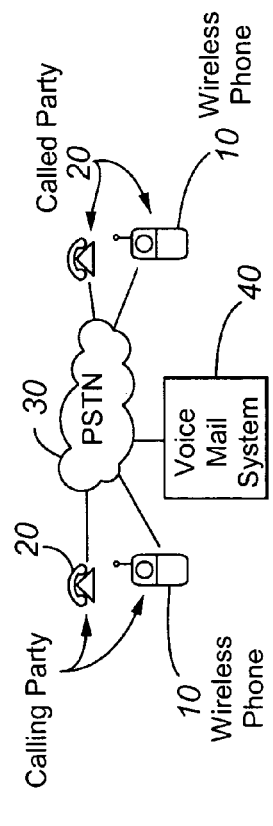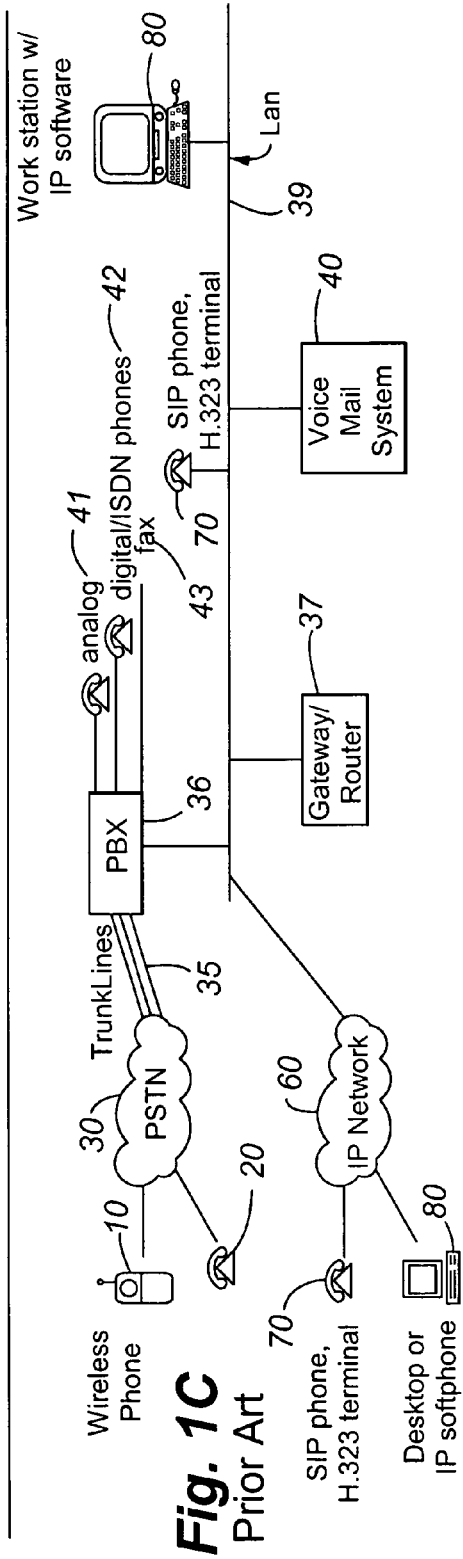

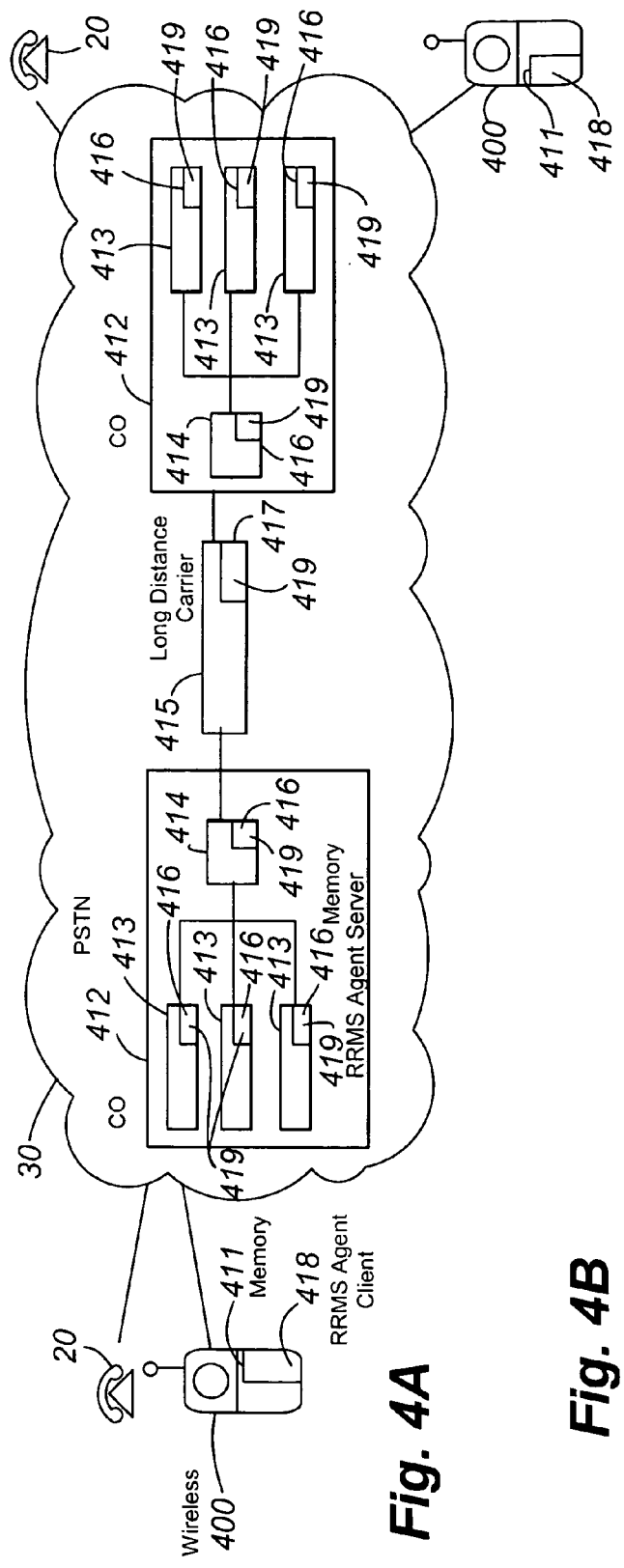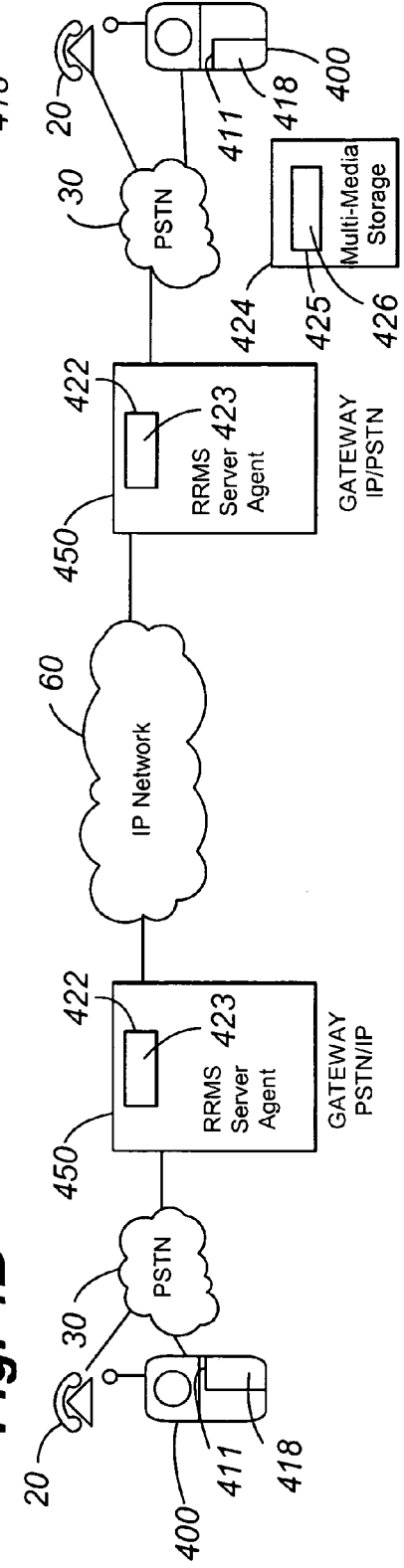
Fig. 4A
Fig. 4B

USER CUSTOMIZABLE REVERSE RING TONE

CROSS-REFERENCE TO RELATED APPLICATIONS

This application claims the benefits under 35 U.S.C. §119 of U.S. Provisional Patent Application Ser. No. 60/558,433, filed Mar. 31, 2004, of the same title and to the same inventors, and contains subject matter related to the subject matter of copending U.S. application Ser. No. 10/801,960, filed Mar. 15, 2004, entitled "Ring-Tone Messaging Service" to Delaney, et al., each of which is incorporated herein by this reference.

FIELD OF THE INVENTION

The present invention is directed generally to telephony services and specifically to providing a message before a called party answers a call.

BACKGROUND OF THE INVENTION

FIGS. 1A, 1B, 1C show three example network communication configurations. In FIG. 1A, the calling party initiates a call over the public switch telephone network (PSTN) 30 using either a wireline telephone 20 or wireless telephone (e.g., mobile telephone) 10. The call is routed through a gateway 50 to the Internet 60 to save on long distance toll costs. At the remote end, the call is routed to the gateway 50 and PSTN 30 nearest to the called party who may be using either a wireline 20 or wireless phone 10. If the called party does not answer the call, the call is diverted to voice mail 40. Voice mail 40 answers your call, records a message, and notifies you when you have new messages. As will be appreciated, a wireless telephone 10 call is set-up, managed and routed to the PSTN 30 by the mobile switch center (not shown).

In FIG. 1B, the calling party initiates a call over the PSTN 30 using either a wireline telephone 20 or wireless telephone 10. In this example, the call is routed solely through the PSTN 30 to the remote end where the called party may be using either a wireline 20 or wireless telephone 10. If the called party does not answer the call but pays for voice mail 40 service as part of their communications bill, the call is diverted to voice mail 40.

In FIG. 1C, the calling party may initiate a call over the PSTN 30 using either a wireline telephone 20 or wireless telephone 10. Similarly, the calling party may initiate a call over the Internet 60 using a H.323 terminal or the session initiation protocol (SIP) telephone 70. H.323/SIP terminals include IP telephones 70 or IP softphones 80. An IP telephone provides communications capability as analog or digital telephones provide except that communications are routed via the Internet or data network rather than via PSTN. An IP softphone 80 is a client-based telephony application for the desktop PC 80 or laptop 80 that has similar functionality as a desktop IP telephone 70.

At the remote end, the private branch exchange (PBX) 36 is a telephone system that supports enterprise users (college, government office, business, etc.) by answering and transferring inbound and outbound telephone calls to and from the PSTN 30 or Internet 60. All enterprise users share external telephone lines, i.e., trunk lines 35, which saves the cost of requiring a line for each user to the telephone company's central office (CO) (not shown but part of the PSTN 30). PBXs 36 have evolved from being proprietary hardware/software systems completely separate from the packet switched network or LAN 39 to systems running on off-the-shelf servers, interoperable with other servers through open standards and communicating via the LAN 39. Furthermore, the PBX 36 has evolved from strictly routing local and long distance telephone calls over the PSTN 30 to additionally providing the capability to route local and long distance telephone calls over the Internet 60 or over the LAN 39. The PBX 36 operating on packet switched networks allow the enterprise to reduce costs by maintaining one network instead of two (the data and telephone) and reducing charges from toll calls by routing some calls over the packet switched network 39 or Internet 60.

As shown generally in FIGS. 1A, 1B, 1C and 2 when a call is initiated using a wireless telephone 10 or a wireline telephone 20, 41, 42 from outside or within an enterprise and sent via the PSTN 30, the calling party 250 dials the telephone number which is transmitted to the nearest central office (CO) (part of PSTN 252, FIG. 2) along with a call set-up message (FIG. 2, 254a). The local exchange CO comprises one or more carrier class switches (not shown), which take calls and routes the calls to the proper destination based on the dialed number. If the call is a long distance call, the call goes from the local CO to a long distance carrier's class switch on route to the local CO nearest the called party. The call set-up message (FIG. 2, 254a; FIG. 3, 371) for a call sent over the various switches is governed by standards, which are particular to the network in use.

As shown in FIG. 2, the local CO (which is part of the PSTN 252) locates the remote end-point 253 using the dialed telephone number. Once the CO locates the remote end-point 253, the CO sends a call set-up message 254b to the remote end-point 253 as shown in FIG. 2. If the remote endpoint 253 is on and not busy (FIG. 3, 372), an alerting (ringing) signal 256a is sent back to the CO and the CO forwards the alerting (ringing) signal 256b to the calling party 250. The alerting signal tells the calling party the remote endpoint 253 has not answered the call. As shown in FIG. 3, once the called party goes off-hook, i.e., answers the telephone, the telephone at the remote endpoint (FIG. 2, 253) sends a call-connect message 257a (FIG. 3, 357) to the CO. The CO forwards the call-connect message 257b to the calling party (FIG. 2, 251). Now the two endpoints will begin transmitting voice or data between them over the PSTN (FIG. 3, 376, 377). A call termination message is sent by either the calling party or called party to disconnect, i.e., terminate the call (FIG. 2, 258a, 258b, 259a, 259b; FIG. 3, 378).

As shown in FIG. 2, the remote endpoint may be unavailable to answer the call; that is, the telephone is turned off, not connected, or busy, or the called party simply does not answer the call (FIG. 2, 262a; FIG. 3, 372). In this case, if the called party does not have a "follow-me" service (FIG. 3, 373), the call is diverted to a multi-media message storage system (e.g., voice mail system) and the call is answered by the multi-media message storage system (FIG. 2, 263a, 264a, 264b). Once the calling party records the voicemail message (FIG. 3, 374), the calling party terminates the call (FIG. 2, 265a, 265b, 266a, 266b). As will be appreciated, when the called party 253 is busy and has no corresponding multi-media storage system, such as voice mail, a busy signal (not shown) may be returned by the remote endpoint to the calling party. When the calling party's endpoint receives the busy signal, a busy tone, which is different from the ring back tone played in response to the alerting signal 256b, is played to the caller 250. If the called party has a "follow-me" service (FIG. 3, 373), the CO diverts the call to a pre-defined next location (FIG. 3, 373) and tries to contact the called party at each "follow-me" number administered for called party. If the called party is not available at any of the "follow-me" numbers, the CO diverts the call to a multi-media storage system 274.

For IP desktop telephones (FIG. 1, 70) or softphones (FIG. 1, 80) sending calls via the Internet, using session initiation protocol (SIP) or H.323 protocol, the messages sent between the end-points to establish a call and set-up a communication channel are governed by the particular protocol in use. Regardless, the called party at the remote end-point is alerted to an incoming call by a standard ringing signal if the IP end-point is available (FIG. 3, 372). Once the call is answered by the called party, the appropriate establishment and connection messages (FIG. 3, 375) are sent via the Internet or over the data network. Otherwise the call is similarly diverted to a pre-defined next location (FIG. 3, 373), such as a "follow-me" number as administered in the service preferences, or a voice mail system (FIG. 3, 374).

Unfortunately, neither wireline or wireless telephone systems or even paging services currently allow the called party to send a data/bearer stream including voice, text, images or video to the calling party during initiation of a telephone call and before the called party answers the telephone. Mobile phones can be enabled to send and receive SMS or MMS signals. The short message service (SMS) protocol allows mobile users to send short text messages, and the multimedia message service (MMS) protocol allows mobile users to send multimedia messages. SMS also allows a mobile user to send short text messages to and receive text messages from email, paging services or informational services (such as receiving stock quotes). MMS adds images, text, audio clips and video to SMS messages. However, both SMS and MMS messages are not delivered during initiation of a telephone call.

The mobile switch center (not shown) sends SMS messages to a mobile message service center (not shown). If the mobile phone user is available, the SMS message is immediately deliverable to the recipient and the mobile message center sends the message to the recipient. Otherwise, the message is stored in the mobile message service center until the mobile user is available.

The mobile switch center (not shown) sends MMS messages to a mobile message service center (not shown). The message service center sends the sender a message confirmation that the message was sent. The message service center then sends the recipient a message notification that a new message has arrived. The recipient can download the message immediately or later. Once the recipient has successfully downloaded the message, the sender gets a message delivered confirmation message.

For mobile phones that use polyphonic ring tone technology, the mobile telephone user can download various high quality tones and administer his user preferences to play a particular tone on his phone when a particular incoming call arrives. Alternatively, the mobile telephone user can record his voice and administer his user preferences to play the recording of his voice on his phone when a particular person is calling or for any incoming call. These polyphonic ring tones are administered and recorded by the called party mobile telephone owner to play when a call is received from a calling party.

Current voice paging systems associated with telephones are typically used in a facility to broadcast messages to locate individuals or announce messages, such as emergencies or sales. When the paging system is used to locate individuals, the individual still needs to call back the person who initiated the page. The person initiating the page cannot use the paging system to initiate a telephone call to locate an individual. The person receiving the page cannot send a data/bearer stream attached to the paging party before the called party answers the page.

SUMMARY OF THE INVENTION

These and other needs are addressed by the various embodiments of present invention. The present invention generally forwards a multi-media message from the first user of a called communication device to a second user of a calling communication device. The calling communication device plays the message to the second user before a bi-directional communication path is established between the first and second users.

In a first embodiment of the present invention, a method is provided that includes the steps:

(a) the calling communication device sends a call set-up message to the called communication device; and (b) in response thereto, the called communication device sends a call establishment message (or reverse ring tone message) to the calling communication device. As used herein, a "call establishment message" refers to any message exchanged between at least two communication devices or between a communication device and another computational component acting on the other communication device's behalf before a bi-directional communication path is established therebetween. The call establishment message can include a call alerting or ringing message, an acknowledge message, a call proceeding message, and the like.

The call establishment message includes a prerecorded message from the first party to the second party and/or a request to open a bearer channel from the calling communication device to the called communication device. The prerecorded message can include voice, text, a picture, a holographic image and/or a video multi-media message from the called party. The prerecorded message is played by the calling communication device, typically instead of a reverse ring tone or ringback tone, before the called party answers the Call.

The prerecorded message may be in band or out of band with the call. The message may be attached as a Multimedia Message Service or MMS message to a call establishment message or sent it as a text-message, such as a Short Message Service or SMS message, and converted into an audible message at the calling communication device using text-to-speech conversion techniques. The message may, for instance, be used to alert the calling party to the called party's identity and provide additional, information to the calling party that is important to the called party before the called party answers the call. The call may be sent via the PSTN, an IP network such as the Internet or over a data network. Of course, if the calling and called party endpoints (i.e., telephones or other communication device) allow for text, images and video, the recorded data/bearer stream sent with the call set-up message to initiate the call may include text, images or video in addition to voice.

In a second embodiment of the present invention, the calling party may administer a special introductory ring tone on his telephone or communications device to play when the calling party receives a recorded message or data/bearer stream from the called party. After the special introductory ring tone plays, the called party's message or the data/bearer stream plays before the called party answers the call. This special introductory ring tone may be administered to play for any called party or for a particular called party.

In a further embodiment, the calling party and called party endpoints may publish and exchange information regarding multimedia capabilities. Once the endpoint multimedia capabilities are known, the calling party endpoint allows the calling party to send a voice, text, image, or video message attached to a call establishment message to the calling party.

In another embodiment, a user may configure various messages for differing sets of callers. When a person calls, the appropriate message is forwarded to the caller's communication device.

The embodiments of the present invention can offer advantages over the prior art. By way of example, the present invention can convey valuable information to a caller or discourage the caller from continuing with the call. An example of the former case is where a retailer sends to calling parties information, such as advertisements, that may lead to increased sales revenue. Another example is where the called party desires specific callers to try a different number where the callee may be currently located. An example of the latter case is where a private party sends to telemarketers a message to terminate immediately the call before the called party answers the call. This permits the called party to avoid the inconvenience of conveying the message verbally to the telemarketer. Although reverse ring tones or ringback-tones are currently in use, the ringback-tones are unable to convey a voice message from the callee to the caller. The use of customizable reverse ring tones provides communication device users with another modality through which to express their creativity/individuality. Such expression is increasingly attractive to the consuming public.

BRIEF DESCRIPTION OF THE DRAWINGS

FIGS. 1A-C shows three prior art examples of possible communication network configurations.

FIG. 4A is a diagram showing the RRTMS enabling of a communication device for one network configuration according to the present invention.

FIG. 4B is a diagram showing the RRTMS enabling of a communication device for another network configuration according to the present invention.

DETAILED DESCRIPTION

Figure 2:
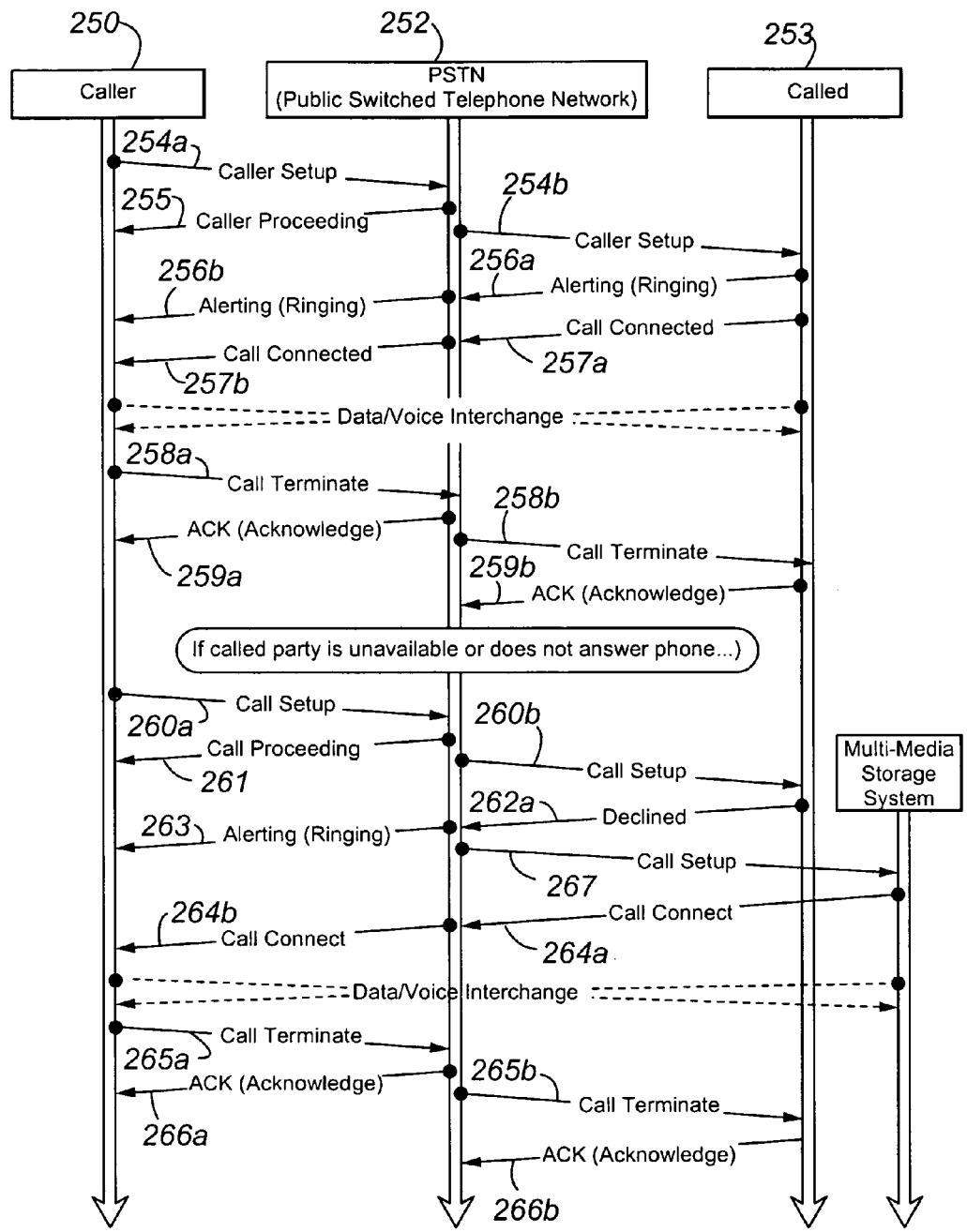
FIG. 2 is a diagram showing prior art call procedure messages sent over the PSTN.
Figure 3:
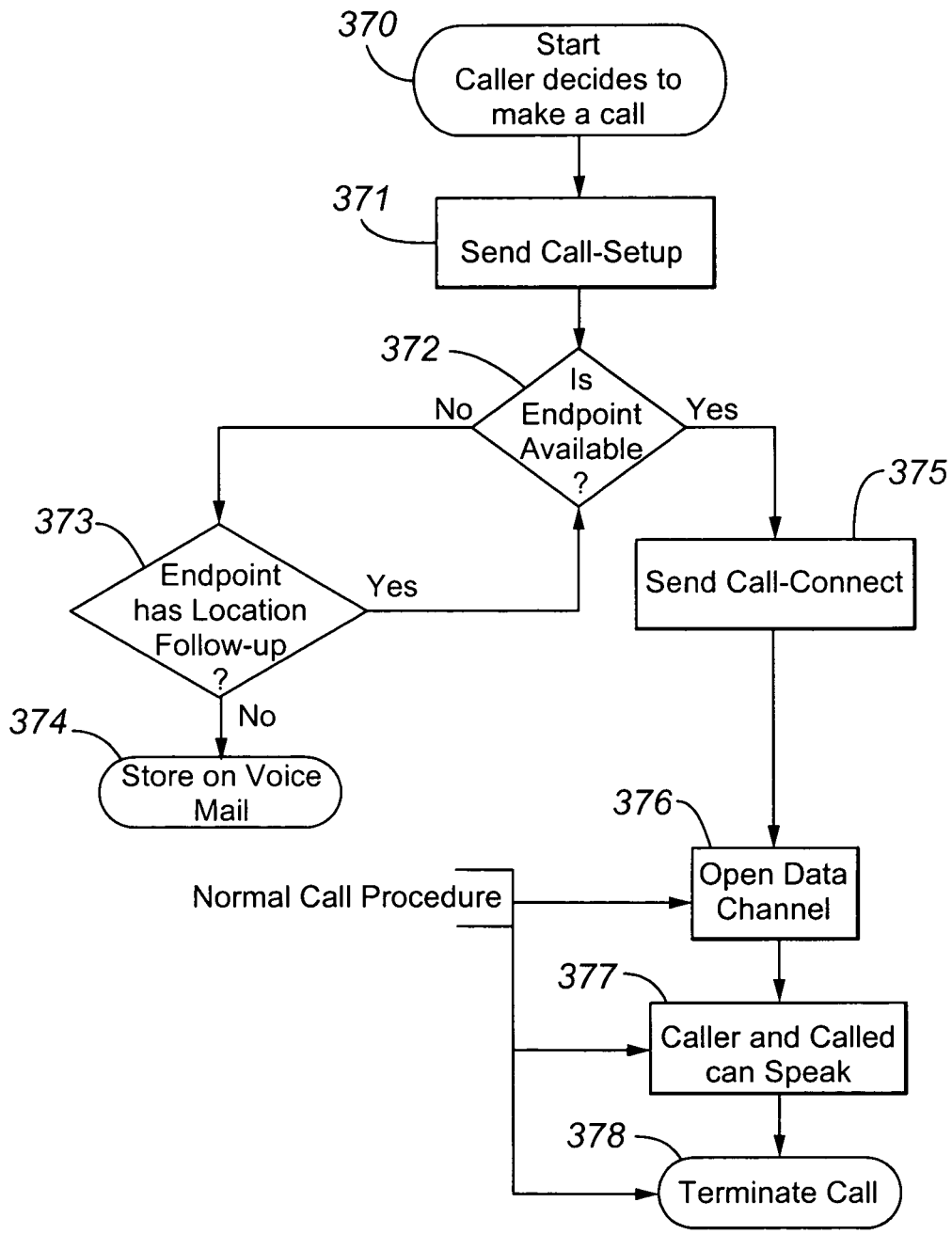
FIG. 3 is a high level flow diagram showing the prior art method used to establish calls for wireline and wireless calls over the PSTN, Internet, or data network.

As discussed previously, FIGS. 1A, 1B and 1C are examples of three different prior art network communication configurations. These network communication configurations are adaptable to enable the reverse ring tone message service (RRTMS) agent, which includes a client and server software. The RRTMS agent is an application programming interface (API) that communicates with the underlying network through function calls to perform its function. The RRTMS agent enables the communication network to provide important information either, as voice, text, image or video from a called party to a calling party before the called party answers a telephone. The RRTMS agent (client or server) interfaces with the various components of the communications network, such as the communication device, to recognize the reverse ring tone message (RRTM). The RRTMS agent allows the called party to record a RRTM attached to a call establishing message, such as a call alerting message. To adapt these network communication configurations to enable the reverse ring tone message service (RRTMS) several changes are required to various components of the network communications configurations. The communication networks include the PSTN 30, IP network 60, mobile switch center (not shown), etc.

To RRTMS-enable the calling or called party endpoint communication devices, the RRTMS agent client (FIG. 4A, 418) is stored in the calling and/or calling party communication device (FIG. 4A, 400). The communication device can be wireless, satellite phones (not shown) or personal digital assistant (PDA) with telephony capability (not shown), wireline, such as analog, digital, ISDN, IP telephones, IP softphones, etc. The communication devices may embed the RRTMS agent client 418 as software stored in a storage device such as memory, flash card or hard-disk drive. Alternatively, the RRTMS agent client 418 may be incorporated in firmware or hardware. To facilitate the recording and storage of the RRTM message, the communication device may use memory, flash card, or a hard-disk storage device. In the calling party communication device 400, the RRTMS agent client 418 receives the RRTMS packet and interfaces with the other components in the calling party communication device to play the RRTMS message.

The RRTMS agent client 418 interfaces with the RRTMS agent server logic 419 embedded in software residing in the communication network, such as the CO 412 (FIG. 4A) to allow a called party to send and a calling party to receive RRTMS messages. Alternatively, the RRTMS agent server 419 may be incorporated in firmware or hardware. As shown in FIG. 4A, communication device 20 communicates and interfaces with the RRTMS agent server 419 residing in CO 412 carrier class switch 413, 414 memory 416 and in long distance carrier switch 415 memory 417. Alternatively, the RRTMS agent server 419 may reside, for example in other storage devices such as a flash card (not shown) or hard-disk storage device (not shown) on the CO 412 carrier switch 413, 414 or long distance carrier switch 415.

The RRTMS agent client 418, for example, instructs the communication device to store a RRTM (voice message) in memory, i.e., a recording of a voice message beforehand. At the calling party endpoint, the RRTMS agent client 418 plays the RRTM over the speaker before the called party answers the call instead of the calling party endpoint playing the standard reverse ring tone or ringback tone. If the calling party endpoint includes multimedia capability, the RRTMS agent client 418 interfaces with the communication device memory 411 to buffer and plays any multimedia components of the RRTM message.

The RRTMS agent client 418 may create the RRTMS message, i.e., RRTM that is attached or associated with a call establishment message. RRTMS messages are subject to the same rules governing quality of service for the voice channel, such as conversion of an analog signal to a digital signal at the CO 412, PBX 36, or Gateway 450; encryption; echo cancellation, etc. Otherwise, if the communication device 400 does not include the RRTMS agent client 418, the communication device 400 interfaces with the RRTMS agent server 419 logic to create the RRTMS message. Likewise, RRTMS messages created by the RRTMS agent server 419 are subject to the same rules governing quality of service for the voice channel.

Figure 6:
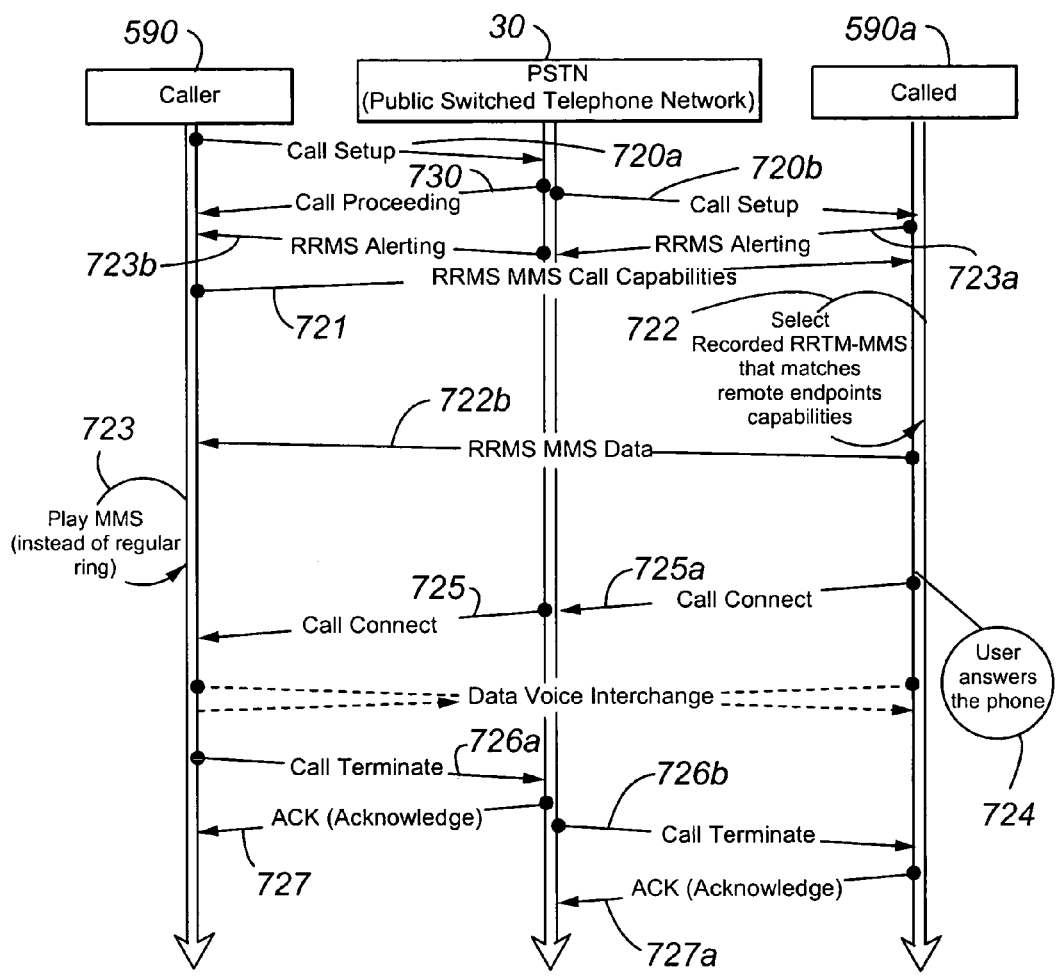
FIG. 6 is a diagram showing the call procedure allowing the endpoints to send an RRTM message with multimedia components.

Some mobile phones are multimedia messaging service (MMS) capable which allows the mobile telephone user to send and receive images, text, audio and video in a message. In an alternate embodiment, the calling party and called party RRTMS agent client 418 may negotiate endpoint multimedia capabilities. If both endpoints are MMS capable but the network 30, 60 is not capable of handling RRTMS messages with multimedia components, the RRTMS agent client 418 on both endpoints may agree to record a multimedia message as an MMS message rather than as a RRTMS message with multimedia components. In this case, the called party endpoint will send the calling party, a call establishment message, such as a RRTMS alerting message (FIG. 6, 720). The MMS data is recorded (FIG. 6, 722) and sent (FIG. 6, 722b) after the endpoints exchange and negotiate multimedia capabilities (FIG. 6, 721). Although the network 60 is identified as the Internet in FIGS. 1A, 1C, and 4B, it is to be understood that the network can be any data network and may employ protocols other than the Transfer Control or Internet Protocols.

Similarly, some mobile phones are short message service (SMS) capable which allows the mobile telephone user to additionally send and receive alphanumeric messages from mobile subscribers, email, paging and voice mail systems. If the calling party and called party RRTMS agent client 418 negotiate endpoint capabilities, both endpoints are SMS capable but the network 30, 60 or device is not capable of handling a RRTMS text message, the RRTMS agent client 418 on both endpoints may agree to send the SMS message rather than convert the message to an RRTMS message with a text component. In this case, the called party endpoint will send the calling party, a call establishment message, such as a RRTMS alerting message (not shown). The SMS message is sent after the endpoints exchange and negotiate multimedia capabilities. At the calling party end, the SMS text message can be displayed on the mobile communication device or a text-to-speech converter may be used to convert the text to speech for the mobile user.

In some cases, a communication device may not be economically retrofitted to store the RRTMS agent client 418 or have sufficient memory to record or store an RRTM message. Additionally a calling or called party communication device may have the capability to receive and send voice but not the capability to receive one or more other multimedia components. In this case, a computer (not shown) that is integrated with the communication device may be used to store the RRTMS agent client 418 in the computer's storage device, such as memory, flash card, or hard-disk storage.

Alternatively, when the communication device does not include the RRTMS agent client 418 or have sufficient memory to record an RRTMS message, the calling party may purchase an RRTMS service plan from their local telephone company. This provides the calling party the same benefits a called party has if they had a RRTMS enabled communication device or at a minimum the capability to send a RRTM voice message. The called party may still administer the RRTMS service, at a minimum record and store a RRTM voice message or buffer a live RRTMS voice message using the local network facilities 416.

To use this service plan, the calling party may have an account requiring them to authenticate themselves with an account name and password. Once successfully authenticated, the called party is presented menu options to allow the called party to configure the RRTMS that he or she wants to send. For example, if the called party chooses to send a RRTM message, menu options will allow the calling party to record or delete a recorded message or store an RRTM message. The calling party may respond to the menu options using dual tone multi-frequency (DTMF) keys from the telephone keypad or voice recognition services.

In an alternative embodiment, the communication device may be capable of receiving and sending voice, text, images, and video. However, the calling party or called party may not have the capability to retrofit the communication device 10 to record or store a multimedia RRTM message. In this case, the calling or called party may purchase an RRTMS service plan from their local telephone company to administer the RRTMS service or record or store a RRTM multimedia message using the local network facilities 416. The account may require the calling or called party to authenticate themselves with an account name and password. Once successfully authenticated, the called party is presented with menu options to allow the called party to choose the RRTMS message he or she wants to send. For example, if the called party chooses to send a multimedia RRTM message, menu options will allow the called party to record or delete a recorded message or store an RRTM message As previously mentioned, the called party may respond to the menu options using dual tone multi-frequency (DTMF) keys from the telephone keypad or voice recognition services.

The RRTMS agent client 418 has administrable features. For example, the calling party may administer the RRTMS agent client 418 in the calling party communication device. One administrable feature may be whether to play the RRTM once or even repeatedly before the called party answers the call. This administered parameter may be for an RRTM received from any called party or from a specific called party. Hence, an RRTM from a family member may be administered to play repeatedly whereas an RRTM from the boss is played only once. Alternatively, the calling party may administer this feature from his account on a RRTMS service plan provided by the local telephone company. Another administrable feature is to disable playing the RRTM completely (e.g., repeatedly from family members, once from the boss, and never from the bank manager).

The calling party may administer the RRTMS agent client 418 to record and store a special introductory ring tone on the communications device to play when the calling party receives a RRTM. The RRTMS agent client 418 may play this special introductory ring tone before playing the RRTMS message from any called party or from a specific called party. Rather than the calling party communication device playing the standard ring tone for an incoming call. After the special introductory ring tone plays, the RRTM plays before the calling party answers the call. Alternatively, the calling party may administer this feature from his account on a RRTMS service plan provided by the local telephone company.

Some mobile telephones play polyphonic ring tones. In this case, the RRTMS agent client 418 interfaces with the software, firmware or hardware that selects, records and plays the polyphonic ring tone. The calling party may be allowed to administer the polyphonic ring tone to play as the special introductory ring tone on the communications device prior to playing the RRTM rather than the calling party communication device playing the standard ringback tone for an incoming call.

In an alternative embodiment, the called party may administer the RRTMS agent client 418 to use a previously recorded RRTM stored in the communication device memory 411 when a particular person calls. This allows the called party to select a previously recorded RRTM when the called party receives a call from a particular person.

Alternatively if the called party has an RRTMS service plan, the previously recorded RRTM may be stored on network facilities, such as in CO 412 carrier class switch 413, 414 memory 416 or in long distance carrier switch 415 memory 417. This allows the called party to select a previously recorded RRTM when receiving a call from a particular person. As the called party may administer the communication device, the called party may administer the RRTMS agent server 419 to associate the previously recorded RRTM to a calling party when a call is received from the calling party.

In another alternative embodiment, the calling party and called party endpoints may administer a feature that allows the RRTMS agent client 418 to exchange information regarding multimedia capabilities. The RRTMS agent server residing in the CO 412 memory 416 or long distance carrier switch 415 memory 417 is administered to assist in the exchange of information between endpoints. Once the called party RRTMS agent client 418 knows the calling party communication device multimedia capabilities, the RRTMS agent client 418 may prevent the called party from sending inappropriate multimedia components to the calling party.

However, the calling party communication device may have an associated resource, such as text-to-speech (TTS) or automatic speech recognition (ASR), residing, for example, on an associated computer. The associated computer may have an associated monitor. If the calling party device is not capable to receive text or speech, the TTS or ASR resource may convert a multimedia component as administered by the calling party. For example if the communication device is not text capable, the calling party RRTMS agent client 418 will respond to the request for exchange of information and notify the called party RRTMS agent client 418 that a text component in the RRTM is receivable. The calling party communication device will not display the text. Instead, the calling party RRTMS agent client 418 will interface with the TTS resource and convert the text-to-speech and play the speech to the called party before the called party answers the call. Alternatively, the calling party communication device may not display the text but the associated computer monitor will display the text.

Similarly if the communication device is not capable of playing speech, the calling party RRTMS agent client 418 may respond to the request for exchange of information and notify the called party RRTMS agent client 418 that a speech component in the RRTM is receivable. The calling party communication device will not play the received speech. Instead, the calling party RRTMS agent client 418 will interface with the ASR resource and convert the speech to a transcript of the speech and display the transcript to the calling party before the calling party answers the call.

Figure 7:
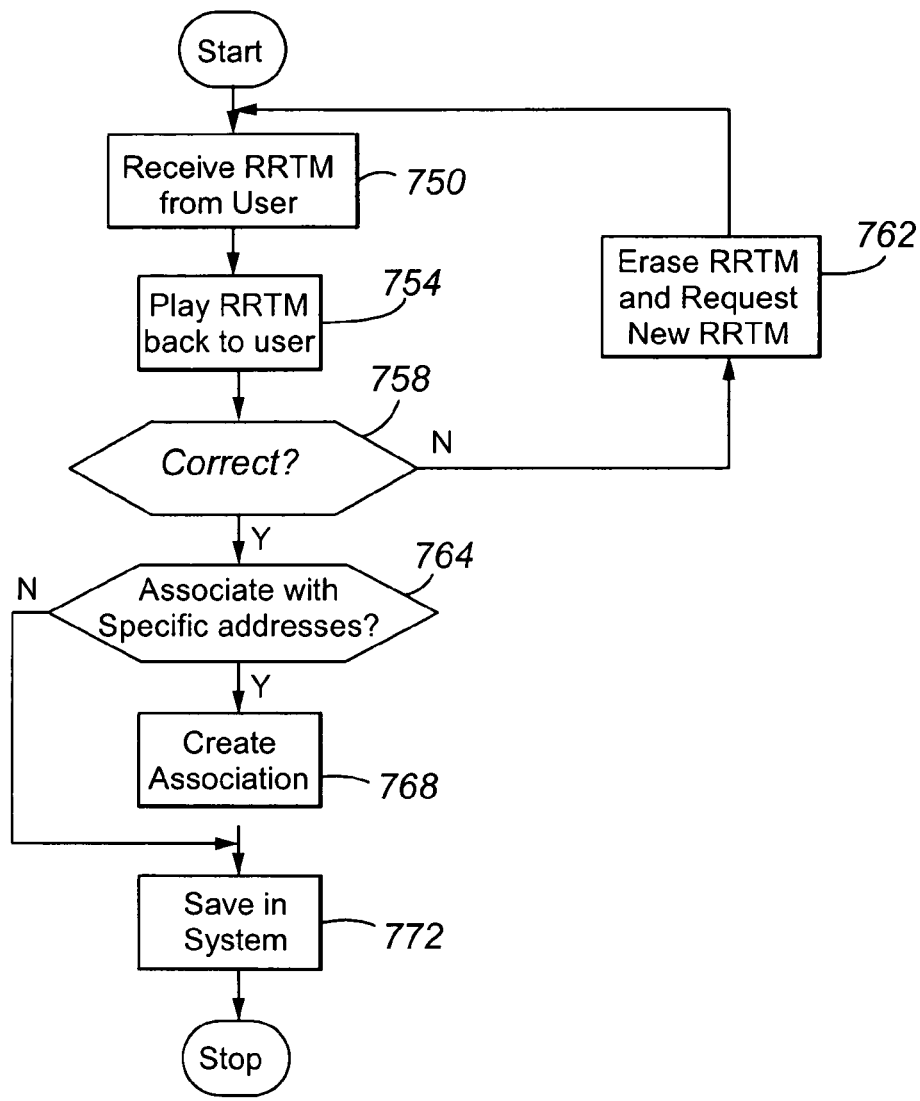
FIG. 7 is a flowchart showing the process for RRTMS configure a communication device.

FIG. 7 depicts an embodiment of a method to configure a communication device to send a RRTM. In step 750, the RRTMS agent receives an RRTM inputted by the user. In step 754, the RRTMS agent plays the RRTM back to the user. In decision diamond 758, the RRTMS agent queries the user whether or not the RRTM is correct (whether the user wishes to change the RRTM). If the RRTM is incorrect, the agent, in step 762, erases the RRTM and requests the user to enter a new RRTM. The agent then returns to step 750. If the RRTM is correct, the agent, in decision diamond 764, requests whether the user wishes to associate the RRTM with a specific electronic address, such as a telephone number, a Universal Resource Indicator or URI, a Universal Resource Locator or URL, a Session Initiation Protocol or SIP address, and the like, or a set of electronic addresses. In this way, the user can configure differing RRTM's for differing sets of addresses. Some addresses may specifically be allowed to receive a standard alerting message (to play a standard reverse ring tone or ringback tone) when calling the device. When the user desires to associate the RRTM with a specific address or set of addresses, the agent, in step 768, receives the address(es) and creates the association of the address(es) with the RRTM. When the user does not desire to associate the RRTM with a specific address or set of addresses (thereby using the RRTM for all incoming calls) or after step 768 is completed, the agent, in step 772, saves the RRTM in the memory of the device.

To RRTMS enable communication networks, such as the PSTN 30, Internet 60, or mobile switch center (not shown), the RRTMS agent server 419 interfaces with the network specific protocols used in the PSTN 30, Internet 60 or mobile switch center (not shown) to establish a RRTMS call and ensure the components of the RRTMS message are recognized and associated with the RRTMS call. As shown in FIG. 4A, the RRTMS agent server 419 is located in the CO 412 carrier class switch 413, 414 memory 416 or in the long distance carrier switch 415 memory 417. FIG. 4B shows a communication network that routes a call from the PSTN 30 to the Internet 60 to save on long distance toll charges. At the remote end, the call is routed to the PSTN 30 to the called party. In this case, a RRTMS agent server 423 additionally resides on the near and remote end Gateway 450 memory 422. The RRTMS agent server 423 ensures the RRTMS message is routed with the call through the Internet to the appropriate Gateway 450 and PSTN 30 at the remote end. For a wireless communication network, the RRTMS agent server may reside in memory within the mobile switch center (not shown). To RRTMS enable the enterprise communication network as shown in FIG. 1C, the RRTMS agent server (not shown) resides in PBX 36 storage device, such as memory, flash card, or hard disk-drive (not shown).

There is no requirement the RRTMS agent server 419, 423 is stored in memory, hence the RRTMS agent server 419, 423 may be stored in a storage device, such as flash card or a hard-disk drive. Alternatively, the RRTMS agent server 419, 423 may be incorporated in firmware or hardware.

To facilitate the recording of the RRTM message until the calling party answers the call, the PSTN 30, Internet 60, or data network 39 may include storage devices such as additional memory, flash card, or hard-disks.

The RRTMS agent server 419, 423 interfaces with the network specific protocols to allow the RRTM or the live-RRTMS to be sent and received in-band, i.e., within the same channel (e.g., time slot or connection), as the signaling information. When required the RRTMS agent server 419, 423 interfaces with the network specific protocols to allow the RRTMS message be sent out-of-band, i.e., a different channel (e.g., time slot or connection) is used for signaling and voice transmission. For those communication network protocols in the PSTN 30 that require out-of-band signaling, the RRTMS agent server 419, 423 interfaces with the network specific protocol to open a short lived bearer (i.e., voice) channel between the called party endpoint and PSTN 30. Additionally, the RRTMS agent server 419, 423 interfaces with the network specific protocol to open a short lived bearer (i.e., voice) channel between the PSTN 30 and the calling party endpoint to send the RRTM to the called party. Otherwise, if the voice and signaling information are sent within the same channel, i.e., in-band, the RRTMS agent server 419, 423 interfaces with the network specific protocol software to include the RRTM or live-RRTMS message as part of the call establishment message.

For an Internet 60 or data network, such as a LAN (FIG. 1, 39), call establishment messages are control messages and are not sent together with the voice transmission, i.e., this is out-of-band signaling. In this case, the RRTMS agent in the PBX (not shown) interfaces with the Internet Protocol (IP) call establishment messages to ensure the IP network recognizes the additional separate packets containing the RRTM voice message.

For mobile telephone users that have SMS or MMS enabled on their phones, the RRTMS agent server 419 on the mobile message service center (not shown) may convert the RRTM or live-RRTMS message to an MMS message. The RRTMS agent server 419 may then store the converted message in the mobile message service center.

Figure 5:
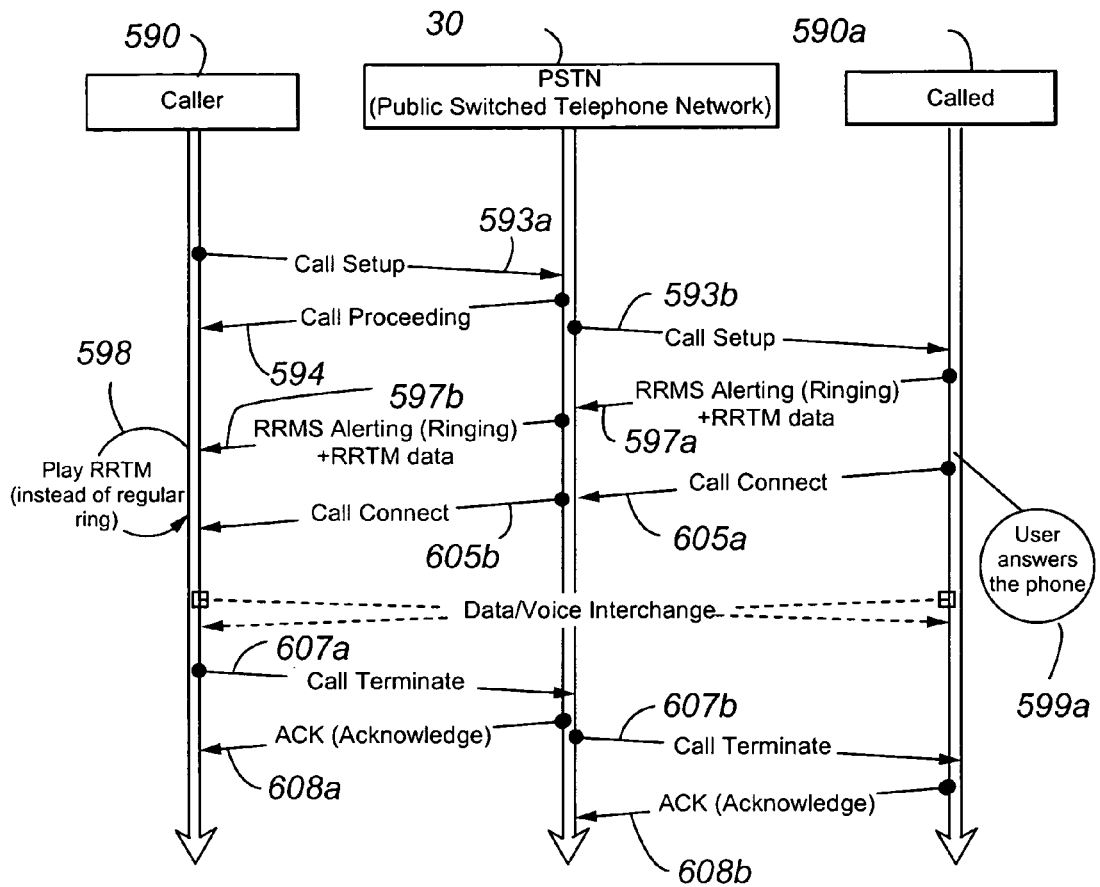
FIG. 5 is a diagram showing the call procedure to send a reverse ring-tone message (RRTM) over the PSTN according to the present invention.
Figure 8:
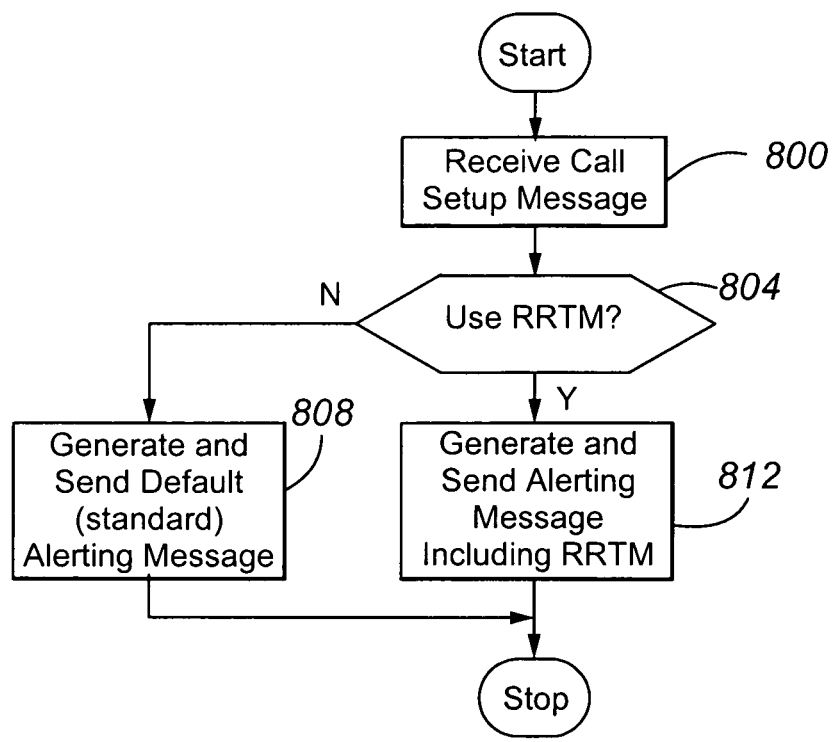
FIG. 8 is a flowchart showing the operation of an RRTMS agent in the called communication device.
Figure 9:
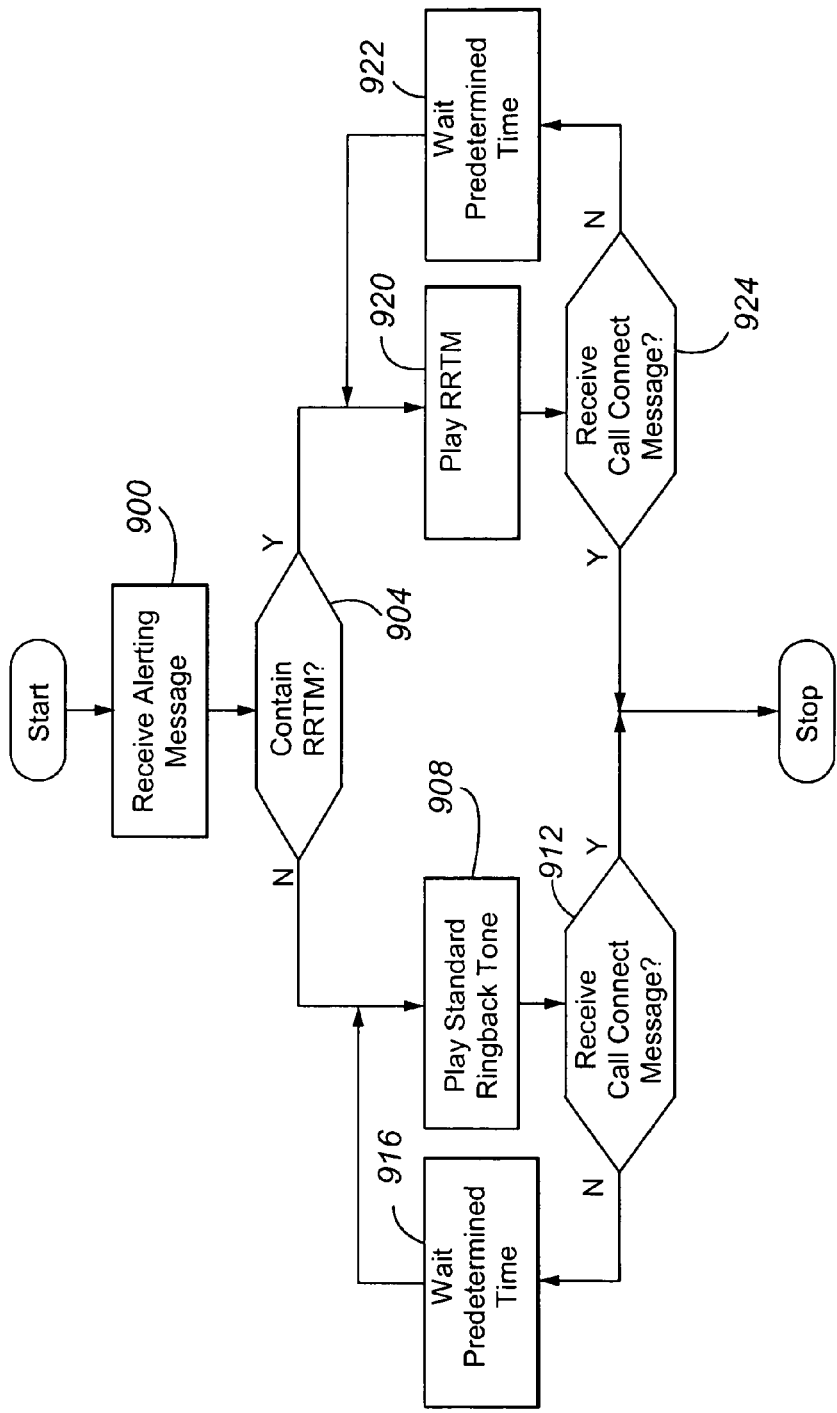
FIG. 9 is a flowchart showing the operation of an RRTMS agent in the calling communication device.

An operational embodiment of the present invention will now be discussed with reference to FIGS. 5 and 8-9.

The process starts when the caller initiates a call from his communication device. The caller's communication device generates and sends a call setup message 593*a* to the local CO 412 within PSTN 30. The local CO 412 returns a call proceeding message 594 to the calling party 590 and sends the call set-up message 593*b* to the called party endpoint 590*a*. The called party endpoint receives the call setup message 593*b* in step 800 and determines, in decision diamond 804, whether the called party has configured the device to respond with an RRTM. As noted, this determination may require the calling party's address to be mapped against a collection of electronic addresses to determine the appropriate RRTM, if any, to send to the particular caller. If the called party has configured the device to respond to the call setup message 593 with a RRTM, the agent 418 in the called communication device generates and sends, in step 812, an alerting message 597*a* including the RRTM data (as shown). If the called party has not configured the device to respond to the call setup message 593 with a RRTM, the agent in the called communication device generates and sends, in step 808, the default (standard) alerting message (which does not contain a RRTM).

The alerting message 597*a* is received by the local CO 412 within PSTN 30 and forwarded as alerting message 597*b* to the calling party's communication device. In step 900, the calling party's communication device receives the alerting message 597 including the RRTM data. In decision diamond 904, the agent 418 in the calling party's communication device determines whether or not the alerting message includes RRTM data. If not (which is not the case in the depicted call flow of FIG. 5), the device in step 908 plays a standard reverse ring tone or ringback tone to the calling party. If so (which is the case in the depicted call flow of FIG. 5), the device in step 920 plays the RRTM to the calling party. After performing either step 908 or 920, the agent 418 in decision diamond 912 or 924, respectively, determines whether a call connect message 605 has been received from the called communication device. If not, the agent 418 waits a predetermined time in step 916 or 922, as appropriate, and repeats the applicable of steps 908 and 920 to repeat playback of the standard reverse ring tone or RRTM. As noted, the calling party's communication device may be configured to restrict the number of times the RRTM is played. If the call connect message is received, the agent 418 terminates operation.

When the called party answers the call, the called communication generates a call connect message 605*a*, which is forwarded by the local CO 412 to the calling party's communication device. The calling and called party communication devices thereafter exchange data/voice information.

When either the calling party or called party hangs up, i.e., terminates the call, a call terminate message 607*a* is sent from the endpoint that terminated the call to the local CO 412. The local CO 412 sends an acknowledge message 608*a* to the party that terminated the call and sends the call terminate message 607*b* to the remote endpoint to notify the remote endpoint the other party terminated the call. The remote endpoint sends an acknowledge message 608*b* to the local CO 412.

FIG. 6 shows another operational embodiment of the present invention where a RRTM message may include multimedia components, such as text, image and video. In this embodiment, the communication device may be a RRTMS and MMS-enabled mobile telephone or a RRTMS and SMS-enabled mobile telephone, where the RRTM message includes the MMS or SMS message component to create the RRTMS MMS message. Alternatively in this embodiment, the calling and called party may have RRTMS enabled telephones with multimedia capabilities, such as text and/or image and/or video.

To initiate the call, the calling party, dials the called party's 590*a* telephone number. A call set-up message 720 including the dialed telephone number is sent to the local CO 412 within PSTN 30. The local CO 412 returns a call proceeding message 730 to the calling party 590 and sends the call set-up message 720*b* to the called party endpoint 590*a*. The called party endpoint receives the call setup message 720*b* and, in response, sends an RRMS alerting message, including a request for information regarding multimedia capabilities at the remote endpoint. The local CO 412 forwards the message 732*b* to the calling endpoint. The calling party endpoint responds with a RRTMS-MMS Call Capabilities message 721 that includes the multimedia capabilities of the called party telephone.

At the called party endpoint, the RRTMS enabled telephone allows the called party to record and send a RRTM message which includes the multimedia components that match the calling party's telephone multimedia capabilities 722. This recorded RRTM message is sent in a RRTMS-MMS data message 722*b* to the calling party endpoint.

At the calling party endpoint, the recorded RRTMS MMS message, i.e., RRTM message with multimedia components, the RRTM with MMS components, or RRTM with SMS component plays 723 instead of the standard reverse ring tone or ringback tone to confirm to the calling party that the call is ringing on the called party's endpoint. The recorded RRTM with multimedia components, MMS or SMS message will play once or repeatedly on the calling party's telephone depending how the calling party administered the RRTMS agent client 418 on his telephone.

If the called party answers the call 724, the called party endpoint 590*a* sends the call connect message 725*a* to the local CO 412 which sends the message to the calling party local CO 412. The calling party local CO 412 sends the call connect message 725 to the calling party 590 to establish the call between the calling party and the called party. When either the calling party or called party hangs up, i.e., terminates the call, a call terminate message 726 is sent from the endpoint that terminated the call to the local CO 412. The local CO 412 sends an acknowledge message 727 to the party that terminated the call and sends the call terminate message 726*a* to the remote endpoint to notify the remote endpoint the other party terminated the call. The remote endpoint sends an Acknowledge message 727*a* to the local CO 412.

Finally, nothing limits the RRTMS enabled network to a PSTN 30 network. The RRTMS enabled network may include Internet 60, a mobile switch center (not shown) or a combination including an enterprise network, such as shown in FIG. 1C.

As will be appreciated, numerous other embodiments may be envisioned using the teachings of the present invention.

For example, other circuit-switched or packet-switched protocols may be used to define the various call flows. Examples of such protocols include SIP, H.323, Integrated Services Digital Network or ISDN, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or foRRTMS disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternative, interchangeable and/or equivalent structures, functions, ranges or steps to those claimed, whether or not such alternative, interchangeable and/or equivalent structures, functions, ranges or steps are disclosed herein, and without intending to publicly dedicate any patentable subject matter.

What is claimed is:

1. A communication method between communication devices, comprising:
   receiving, at a calling communication device and as part of a call establishment message, at least one of a voice, text, a picture, a video, and a holographic message from a first user of a called communication device to a second user of the calling communication device, the at least one of a voice, text, a picture, a video, and a holographic message being associated with a pending call from the second user of the calling communication device and relating to at least one of the first and second users, wherein the at least one of a voice, text, a picture, a video, and a holographic message is a personal message from the first user; and
   before the call is answered by the first user, the calling communication device playing said at least one of a voice, text, a picture, a video, and a holographic message for the second user, wherein the calling communication device plays the at least one of a voice, text, a picture, a video, and a holographic message instead of playing a reverse ring tone; and
   playing, by the calling communication device, a unique introductory ring tone immediately prior to the calling communication device providing the second party with the at least one of a voice, text, a picture, a video, and a holographic message.

2. The method of claim 1, wherein the at least one of a voice, text, a picture, a video, and a holographic message is a prerecorded message related to the first user and wherein the called communication device comprises a plurality of different at least one of a voice, text, picture, video, and holographic messages for a plurality of calling communication devices.

3. The method of claim 1, wherein, when the first user answers the call, one or more call connect messages are exchanged between the calling and called communication devices, wherein the at least one of a voice, text, a picture, a video, and a holographic message comprises a picture, and wherein the at least one of a voice, text, a picture, a video, and a holographic message is sent after the calling and called communication devices negotiate multimedia capabilities.

4. The method of claim 1, wherein the at least one of a voice, text, a picture, a video, and a holographic message is received by the calling communication device before a call connect message is forwarded to the calling communication device, wherein the message is multi-media, and wherein the at least one of a voice, text, a picture, a video, and a holographic message is sent after the calling and called communication devices negotiate multimedia capabilities.

5. The method of claim 1, wherein the at least one of a voice, text, a picture, a video, and a holographic message is included in an alerting message sent by the called communication device, wherein the at least one of a voice, text, a picture, a video, and a holographic message comprises video, and wherein the at least one of a voice, text, a picture, a video, and a holographic message is sent after the calling and called communication devices negotiate multimedia capabilities.

6. The method of claim 4, wherein the at least one of a voice, text, a picture, a video, and a holographic message is forwarded to the calling communication device after a call set-up message is received by the called communication device from the calling communication device.

7. The method of claim 1, wherein, at any one time, a plurality of introductory ring tones corresponding to a plurality of called addresses are stored by the calling communication device.

8. The method of claim 1, wherein the at least one of a voice, text, a picture, a video, and a holographic message is sent by the called communication device and received by the calling communication device in-band and wherein the at least one of a voice, text, a picture, a video, and a holographic message is a text message and further comprising:
   converting the text message to speech before the step of playing the at least one of a voice, text, a picture, a video, and a holographic message for the second user.

9. The method of claim 1, wherein the step of playing the at least one of a voice, text, a picture, a video, and a holographic message for the second user is repeated until the call is answered by the first user, wherein the number of times the step of playing the at least one of a voice, text, a picture, a video, and a holographic message for the second user is repeated depends on the identity of the called communication device, wherein the at least one of a voice, text, a picture, a video, and a holographic message comprises a holographic image, and wherein the at least one of a voice, text, a picture, a video, and a holographic message is sent after the calling and called communication devices negotiate multimedia capabilities.

10. The method of claim 1, further comprising:
   the called communication device receiving a call setup message from the calling communication device; and
   determining whether to return to the calling communication device the at least one of a voice, text, a picture, a video, and a holographic message or an alerting message requesting playback of a ringback tone, wherein whether or not the at least one of a voice, text, a picture, a video, and a holographic message or an alerting message is returned is determined by on the identity of the calling communication device.

11. A non-transitory computer readable medium encoded with processor executable instructions to perform the steps of claim 1.

12. The method of claim 1, wherein the message comprises a request to open a bearer channel from the called communication device to the calling communication device and is played to the second user.

13. The method of claim 1, wherein the call establishment message is sent out-of-band relative to a channel to be used for signaling and/or voice transmission.

14. The method of claim 1, wherein the at least one of a voice, text, a picture, a video, and a holographic message contains information unique to the second user.

15. The method of claim 1, wherein, at a selected time, the called communication device is configured to select a different at least one of a voice, text, a picture, a video, and a holographic message for different calling parties.

16. A communication method between communication devices, comprising:
    a called communication device receiving, from a calling communication device, a call set-up message associated with a first party, the calling communication device being associated with a second party;
    the called communication device determining whether to return to the calling communication device a call establishment message or an alerting message requesting playback of a ringback tone, wherein the call establishment message comprises at least one of (i) a personal message from the first party to the second party, the at least one of a personal message relates to at least one of the first and second users, and (ii) a request to open a bearer channel from the calling communication device to the called communication device, wherein the at least one of a personal message and request to open a bearer channel comprises at least one of voice, text, picture, video, and holograph, and wherein the determining step applies the following rules:
    when the address of a calling communication device is associated with a personal message, a call establishment message including the at least one of (i) a personal message and (ii) a request to open a bearer channel is returned to the calling communication device; and
    when the address of a calling communication device is not associated with a personal message, a call establishment message is not returned to the calling communication device and
    the called communication device sending a call establishment message to the calling communication device, wherein the at least one of a personal message and request to open a bearer channel is played by the calling communication device to the second party before a bi-directional communication path is established between the first and second parties.

17. The method of claim 16, wherein the personal message is recorded before the call establishment message is sent and wherein the called communication device comprises a plurality of different at least one of a voice, text, picture, video, and holographic messages for a plurality of calling communication devices.

18. The method of claim 16, wherein the personal message is sent by the called communication device and received by the calling communication device out-of-band using a channel different from a channel used for transmission of the call set-up message.

19. The method of claim 18, wherein the at least one of a personal message and request to open a bearer channel is the request to open a bearer channel.

20. The method of claim 16, wherein the calling communication device plays the at least one of a voice message and request to open a bearer channel instead of playing a ringback tone.

21. The method of claim 19, wherein the call establishment message is transmitted using the channel used for transmission of the call set-up message.

22. The method of claim 16, further comprising:
    playing, by the calling communication device, an introductory ring tone immediately prior to the calling communication device providing the second party with the at least one of a personal message and request to open a bearer channel.

23. The method of claim 16, wherein the calling communication device is configured to play the at least one of a personal message and request to open a bearer channel repeatedly until the call is answered by the second user, wherein a number of times the at least one of a personal message and request to open a bearer channel is played is selected by the second user, and wherein the number of times the at least one of a personal message and request to open a bearer channel is played varies based upon the identity of the called communication device.

24. A non-transitory computer readable medium encoded with processor-executable instructions to perform the steps of claim 16.

25. The method of claim 16, wherein the message contains information unique to the second party.

26. A communication device, comprising:
    memory; and
    a Reverse Ring Message Service (RRTMS) agent operable to send at least one of a voice, text, picture, video, and holographic message from a first user of a called communication device to a second user of a calling communication device, the message being associated with a pending call from the second user to the first user and relating to one of the first and second users; and, before the call is answered by the first user, to play said message for the second user, wherein the message is received by the called communication device after a call setup message is forwarded to the called communication device and before a call connect message is forwarded to the calling communication device and wherein the memory comprises a plurality of messages corresponding to differing calling communication device addresses.

27. The device of claim 26, wherein the calling communication device plays the message instead of playing a ringback tone.

28. The device of claim 26, wherein the message is included in a call establishment message sent by the called communication device and wherein the at least one of a voice, text, picture, video, and holographic message is sent to the calling communication device using a channel different from the channel used for transmission of a call set-up message for the pending call.

29. The device of claim 26, wherein the message is forwarded to the calling communication device after a call alerting message is received by the calling communication device.

30. The device of claim 26, wherein the calling communication device comprises an RRTMS agent and the RRTMS agent in the calling communication device is operable to play an introductory ring tone immediately prior to the calling communication device providing the second user with the at least one of a voice, text, picture, video, and holographic message.

31. The device of claim 26, wherein the message is sent by the called communication device and received by the calling communication device using the same channel used for a call set-up message associated with the pending call.

32. The device of claim 28, wherein the call establishment message is an alerting message.

33. The device of claim 26, wherein the calling communication device comprises an RRTMS agent and the calling device's RRTMS agent is operable to play the message repeatedly until the call is answered by the second user, wherein a number of times the message is played is selected by the second user, and wherein the number of times the message and request to open a bearer channel is played varies based upon the identity of the called communication device.

34. A communication method between communication devices, comprising:
 receiving, at a calling communication device and as part of a call establishment message, at least one of a voice, text, a picture, a video, and a holographic message from a first user of a called communication device to a second user of the calling communication device, the at least one of a voice, text, a picture, a video, and a holographic message being associated with a pending call from the second user of the calling communication device and relating to at least one of the first and second users;
 playing, by the calling communication device, a unique introductory ring tone immediately prior to the calling communication device providing the second user with the at least one of a voice, text, a picture, a video, and a holographic message and
 before the call is answered by the first user, the calling communication device playing said at least one of a voice, text, a picture, a video, and a holographic message for the second user, wherein the calling communication device plays the at least one of a voice, text, a picture, a video, and a holographic message instead of playing a reverse ring tone.

35. The method of claim 34, wherein, at any one time, a plurality of introductory ring tones corresponding to a plurality of called addresses are stored by the calling communication device.

36. A communication method between communication devices, comprising:
 receiving, at a calling communication device and as part of a call establishment message, at least one of a voice, text, a picture, a video, and a holographic message from a first user of a called communication device to a second user of the calling communication device, the at least one of a voice, text, a picture, a video, and a holographic message being associated with a pending call from the second user of the calling communication device and relating to at least one of the first and second users; and
 before the call is answered by the first user, the calling communication device playing said at least one of a voice, text, a picture, a video, and a holographic message for the second user, wherein the calling communication device plays the at least one of a voice, text, a picture, a video, and a holographic message instead of playing a reverse ring tone, wherein the playing step is repeated until the call is answered by the first user, wherein the number of times the playing step is repeated depends on the identity of the called communication device, wherein the at least one of a voice, text, a picture, a video, and a holographic message comprises a holographic image, and wherein the at least one of a voice, text, a picture, a video, and a holographic message is sent after the calling and called communication devices negotiate multimedia capabilities.

37. A communication method between communication devices, comprising:
 receiving, at a called communication device, a call setup message from a calling communication device;
 determining, by the called communication device, whether to return to the calling communication device the at least one of a voice, text, a picture, a video, and a holographic message or an alerting message requesting playback of a ringback tone, wherein whether or not the at least one of a voice, text, a picture, a video, and a holographic message or an alerting message is returned is determined by on the identity of the calling communication device;
 receiving, at a calling communication device and as part of a call establishment message, at least one of a voice, text, a picture, a video, and a holographic message from a first user of a called communication device to a second user of the calling communication device, the at least one of a voice, text, a picture, a video, and a holographic message being associated with a pending call from the second user of the calling communication device and relating to at least one of the first and second users; and
 before the call is answered by the first user, playing, by the calling communication device, said at least one of a voice, text, a picture, a video, and a holographic message for the second user, wherein the calling communication device plays the at least one of a voice, text, a picture, a video, and a holographic message instead of playing a reverse ring tone.

38. A communication method between communication devices, comprising:
 a calling communication device sending a call set-up message to a called communication device associated with a first party, the calling communication device being associated with a second party; and
 the called communication device sending a call establishment message to the calling communication device, wherein the call establishment message comprises at least one of (i) a personal message from the first party to the second party, the at least one of a personal message relates to at least one of the first and second users, and (ii) a request to open a bearer channel from the calling communication device to the called communication device, wherein the at least one of a personal message and request to open a bearer channel is played by the calling communication device to the second party before a bi-directional communication path is established between the first and second parties, and wherein the personal message is sent by the called communication device and received by the calling communication device out-of-band using a channel different from a channel used for transmission of the call set-up message.

39. The method of claim 38, wherein the at least one of a personal message and request to open a bearer channel is the request to open a bearer channel.

40. The method of claim 39, wherein the call establishment message is transmitted using the channel used for transmission of the call set-up message.

41. A communication method between communication devices, comprising:
 receiving, by a called communication device from a calling communication device, a call set-up message, the called communication device being associated with a first party and the calling communication device being associated with a second party;

sending, by the called communication device, a call establishment message to the calling communication device, wherein the call establishment message comprises at least one of a personal message from the first party to the second party, the at least one of a personal message relates to at least one of the first and second users, and a request to open a bearer channel from the calling communication device to the called communication device, playing, by the calling communication device, an introductory ring tone immediately prior to the calling communication device providing the second party with the at least one of a personal message and request to open a bearer channel; and playing, by the calling communication device, the at least one of a personal message and request to open a bearer channel to the second party before a bi-directional communication path is established between the first and second parties.

42. A communication method between communication devices, comprising:

a calling communication device sending a call set-up message to a called communication device associated with a first party, the calling communication device being associated with a second party; and the called communication device sending a call establishment message to the calling communication device, wherein the call establishment message comprises at least one of a personal message from the first party to the second party, the at least one of a personal message relates to at least one of the first and second users, and a request to open a bearer channel from the calling communication device to the called communication device, wherein the at least one of a personal message and request to open a bearer channel is played by the calling communication device to the second party before a bi-directional communication path is established between the first and second parties, wherein the calling communication device is configured to play the at least one of a personal message and request to open a bearer channel repeatedly until the call is answered by the second user, wherein a number of times the at least one of a personal message and request to open a bearer channel is played is selected by the second user, and wherein the number of times the at least one of a personal message and request to open a bearer channel is played varies based upon the identity of the called communication device.

43. A communication device, comprising:

memory; and a Reverse Ring Message Service (RRTMS) agent, in a calling communication device, operable to:

send at least one of a voice, text, picture, video, and holographic message from a first user of a called communication device to a second user of a calling communication device, the message being associated with a pending call from the second user to the first user and relating to one of the first and second users;

before the call is answered by the first user, play said message for the second user; and play an introductory ring tone immediately prior to the calling communication device providing the second user with the at least one of a voice, text, picture, video, and holographic message.

44. A communication method between communication devices, comprising:

receiving, by a called communication device from a calling communication device a call set-up message, the called communication device being associated with a first party, and the calling communication device being associated with a second party; and sending, by the called communication device, a call establishment message to the calling communication device, wherein the call establishment message comprises at least one of a personal message from the first party to the second party, the at least one of a personal message relates to at least one of the first and second users, and a request to open a bearer channel from the calling communication device to the called communication device, wherein the at least one of a personal message and request to open a bearer channel is played by the calling communication device to the second party before a bi-directional communication path is established between the first and second parties, wherein the message is included in a call establishment message sent by the called communication device, wherein the at least one of a voice, text, picture, video, and holographic message is sent to the calling communication device using a channel different from the channel used for transmission of a call set-up message for the pending call, and wherein the call establishment message is an alerting message.

45. A communication method between communication devices, comprising:

receiving, by a called communication device from a calling communication device, a call set-up message, the called communication device being associated with a first party, and the calling communication device being associated with a second party; and sending, by the called communication device, a call establishment message to the calling communication device, wherein the call establishment message comprises at least one of a personal message from the first party to the second party, the at least one of a personal message relates to at least one of the first and second users, and a request to open a bearer channel from the calling communication device to the called communication device, wherein the at least one of a personal message and request to open a bearer channel is played by the calling communication device to the second party before a bi-directional communication path is established between the first and second parties, wherein the calling communication device comprises an RRTMS agent and the calling device's RRTMS agent is operable to play the message repeatedly until the call is answered by the second user, wherein a number of times the message is played is selected by the second user, and wherein the number of times the message and request to open a bearer channel is played varies based upon the identity of the called communication device.

46. A communication method between communication devices, comprising:

receiving, at a calling communication device and as part of a call establishment message, at least one of a voice, text, a picture, a video, and a holographic message from a first user of a called communication device to a second user of the calling communication device, the at least one of a voice, text, a picture, a video, and a holographic message being associated with a pending call from the second user of the calling communication device and relating to at least one of the first and second users, wherein the call establishment message is sent out-of-band relative to a channel to be used for signaling and/or voice transmission; and before the call is answered by the first user, playing, by the calling communication device, said at least one of a voice, text, a picture, a video, and a holographic message for the second user, wherein the calling communication device plays the at least one of a voice, text, a picture, a video, and a holographic message instead of playing a reverse ring tone.

\* \* \* \* \*